United States Patent [19]
Belouet

[11] Patent Number: 6,103,010
[45] Date of Patent: Aug. 15, 2000

[54] METHOD OF DEPOSITING A FERROMAGNETIC FILM ON A WAVEGUIDE AND A MAGNETO-OPTIC COMPONENT COMPRISING A THIN FERROMAGNETIC FILM DEPOSITED BY THE METHOD

[75] Inventor: Christian Belouet, Sceaux, France

[73] Assignee: Alcatel, Paris, France

[21] Appl. No.: 08/931,827

[22] Filed: Sep. 16, 1997

[30] Foreign Application Priority Data

Sep. 19, 1996 [FR] France .................................. 96 11425

[51] Int. Cl.[7] .............................. G02B 6/10; C23C 14/08; C23C 14/24; C23C 14/54
[52] U.S. Cl. ........................ 117/108; 427/529; 427/524; 427/128; 427/163.2
[58] Field of Search ..................... 427/524, 529, 427/530, 128, 129, 131, 163.2; 204/192.21, 192.34, 192.2; 117/106, 108, 103

[56] References Cited

U.S. PATENT DOCUMENTS

| | | | |
|---|---|---|---|
| 3,865,625 | 2/1975 | Yi Cho et al. ........................ | 117/108 |
| 4,071,383 | 1/1978 | Nagata et al. ........................ | 117/108 |
| 4,382,110 | 5/1983 | Takagi et al. ........................ | 428/336 |
| 4,925,700 | 5/1990 | Brezoczky et al. ................... | 427/524 |
| 5,016,563 | 5/1991 | Murakami et al. ................... | 117/108 |
| 5,294,287 | 3/1994 | Chang et al. ........................ | 117/108 |
| 5,356,522 | 10/1994 | Lal et al. ............................ | 204/192.2 |
| 5,607,781 | 3/1997 | Okuno et al. ....................... | 204/192.2 |
| 5,616,218 | 4/1997 | Alex .................................... | 204/192.2 |
| 5,830,270 | 11/1998 | McKee et al. ....................... | 117/106 |
| 5,876,848 | 3/1999 | Tan et al. ............................ | 427/530 |

FOREIGN PATENT DOCUMENTS

WO9419721  9/1994  WIPO .

OTHER PUBLICATIONS

M. Levy et al, "Integrated Optical Isolators with Suputter-Deposited Thin–Film Magnets", *IEEE Photonics Technology Letters*, vol. 8, No. 7, Jul. 1, 1996, pp. 903–905, XP000595616.

H. Hedge et al, "Sputter Synthesis of TbCU$_7$TYPE Cm (CoFeCuZr) Films with Controlled Easy Axis Orientation", *Journal of Applied Physics*, vol. 76, No. 10, Part 02, Nov. 15, 1994, pp. 6760–6762, XP000508828.

*Primary Examiner*—Marianne Padgett
*Attorney, Agent, or Firm*—Sughrue, Mion, Zinn, Macpeak & Seas, PLLC

[57] ABSTRACT

A thin ferromagnetic film is deposited directly onto the surface of a waveguide. The crystalline orientation of the ferromagnetic film is restricted to a predetermined orientation by pulverizing nuclei that do not have the predetermined orientation.

7 Claims, 1 Drawing Sheet

METHOD OF DEPOSITING A FERROMAGNETIC FILM ON A WAVEGUIDE AND A MAGNETO-OPTIC COMPONENT COMPRISING A THIN FERROMAGNETIC FILM DEPOSITED BY THE METHOD

BACKGROUND OF THE INVENTION

1. Field of the Invention

The invention concerns a method of depositing a ferromagnetic thin film onto the surface of a waveguide and a magneto-optic component comprising a waveguide with a ferromagnetic thin deposited by said method.

2. Description of the Prior Art

Magneto-optic isolators are used, among other things, to minimize the reflection of a wave towards its source. "Magneto-optic isolators using the Faraday effect are based on the Faraday rotation principle, i.e. on the rotation of the polarization direction of the wave in a YIG waveguide type component with constant direction saturated magnetization. The process is as follows: the generated wave passes through a polarizer oriented parallel to the polarization of the emitted wave. The wave then passes through the Faraday rotator which rotates its polarization 45°. At the output, the wave passes through an analyzer offset 45° relative to the polarizer. The reflected waves pass through the Faraday rotator in the opposite direction, which rotates the polarization of the reflected waves 45°. The polarization of the reflected waves is then at 90° to the direction of the polarizer (+45° on the outward leg, +45° on the return leg). The reflected waves are therefore stopped by the polarizer and do not affect the source.

To obtain the Faraday effect in the Faraday rotator, the latter must be in a magnetic field parallel to the wave propagation direction. To generate this saturation magnetic field the yttrium-iron-garnet (YIG) core waveguide type component is surrounded by a magnetic film generating sufficient magnetic field in the appropriate direction to magnetize said YIG waveguide type component to the point of saturation in the wave propagation direction.

One method of producing the magnetic film is to grow an SmCo, FeCo or equivalent type polycrystalline film on a substrate favorable to epitaxial growth of the film. The substrate can be GaAs or $Al_2O_3$, for example.

In a second step of the process, the resultant film is stripped from its substrate by chemical separation (epitaxial lift-off).

Finally, the separated film is placed on the YIG core waveguide type component to which it adheres by virtue of Van de Waals forces or to which it is glued with a resin.

The number of steps in this method leads to production costs that are ill-suited to mass production of these magneto-optic isolators. Furthermore, the attached film methods require the component that is to receive the film to have an exterior surface of simple geometry. This significantly limits the geometric structures of the waveguides.

Other methods consist of growing the film directly onto the YIG core waveguide type component. However, the external layers of the waveguide type component are made of materials that are much less favorable to epitaxial growth of the epitaxial film than $Al_2O_3$ or GaAs. The resulting magnetic field is not uniform in amplitude and/or direction. Magnetization of the magneto-optic guide to the point of saturation is therefore not guaranteed at all points on the guide and the isolation characteristics of the isolator are limited.

One aim of the present invention is to propose a method of depositing a magnetic film directly onto a YIG core waveguide type component in which the crystalline orientation of the film is very significantly improved compared to existing direct deposition methods.

SUMMARY OF THE INVENTION

To this end, the invention consists of a method of depositing a ferromagnetic thin film directly onto the surface of a waveguide wherein the crystalline orientation of the ferromagnetic film is restricted to a predetermined orientation by pulverizing nuclei that do not have the predetermined orientation.

In the above method, a ferromagnetic material is deposited onto the exterior surface of the waveguide by a vapor phase physical deposition method associated with ionic bombardment of the surface.

Simultaneously, the exterior surface is irradiated by an ion beam at a so-called channeling angle of incidence so that the film has the predetermined crystalline direction and the energy of the ion beam is adjusted (from a few tens of eV to a few hundred eV) so that nuclei that form with a crystalline texture different from the predetermined crystalline texture are pulverized by the ion beam.

In one embodiment of the method, a submicron layer of a material favorable to adhesion of the ferromagnetic film is deposited before depositing the ferromagnetic material.

This submicron adhesion layer can advantageously have a composition gradient starting from a material that is optimal for adhesion to the waveguide.

The invention also consists of a Faraday rotation magneto-optic isolator in which the magnetic film has been deposited by the method described hereinabove.

One advantage of the present invention is to the significantly improve in the average crystalline orientation of the magnetic film.

The resulting magnetic field is more homogeneous in terms of amplitude and direction. The attenuation of the isolator is increased compared to prior art isolators.

Furthermore, the direct deposition of a buffer layer onto the waveguide component makes it possible to modify the mechanical stresses induced by the magnetic film on the waveguide component and thereby obtain better control of the global linear birefringence resulting from different sources, including the waveguide shape birefringence, the birefringence associated with the stresses generated by the various crystalline parameters between all of the layers constituting the waveguide component (inclusive of the substrate), the birefringence due to the stresses induced by the different coefficients of thermal expansion of each layer of the waveguide component (inclusive of the substrate).

The birefringence phenomena induce elliptical polarization of the incident wave with the result that the reflected wave is not completely blocked by the polarizer.

Reducing the linear birefringence in the waveguide reduces this effect and therefore enhances the isolation characteristics of the magneto-optic isolator.

Other advantages and features of the present invention will emerge from the following description given with reference to the accompanying drawings.

DETAILED DESCRIPTION OF THE PREFERRED EMBODIMENT

Figure 1:
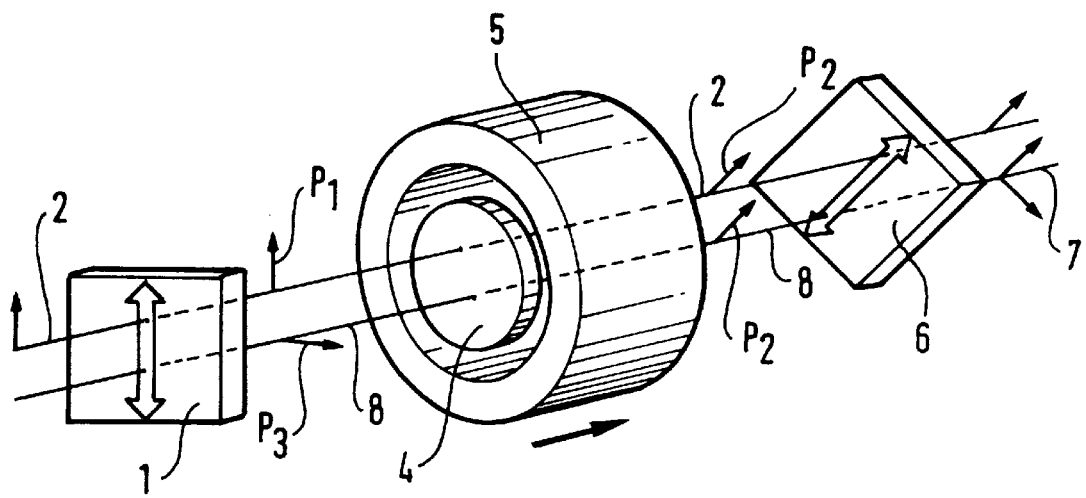
FIG. 1 is a schematic representation of a Faraday rotation type isolator.
Figure 2:
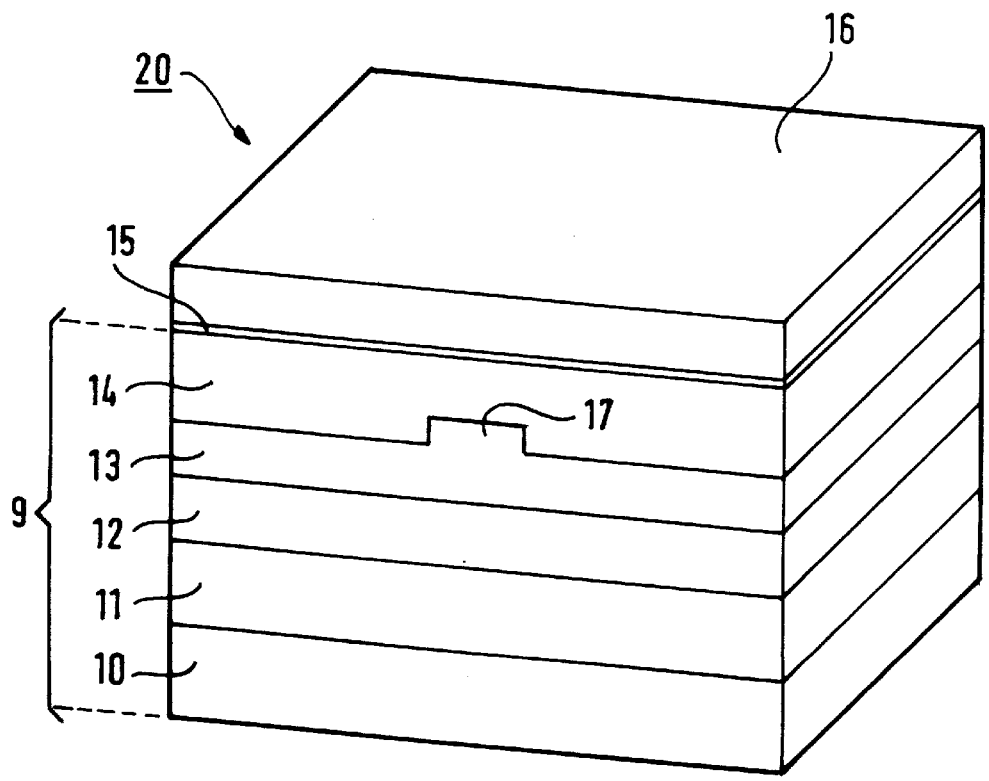
FIG. 2 is a schematic representation of the constituent layers of one embodiment of a magneto-optic isolator of the invention.

A magneto-optic isolator comprises:

a polarizer 1 oriented parallel to the polarization P1 of a wave 2;

a YIG core waveguide type component 4 surrounded by a magnetic film 5; and an analyzer 6 offset 45° relative to the polarizer 1.

Operation: is as follows the wave 2 with polarization Pi generated by a source that is not shown passes through the polarizer 1 with orientation Pi and then through a Faraday rotator 4. Consequently, of which is that the polarization of the wave 2 is rotated 45°, from the polarization P1 to a polarization P2.

At the output, the wave 2 passes through an analyzer 6 offset 45° to the polarizer 1, i.e. in the direction of P2.

Only the reflected waves 8 having a polarization P2 at 45° pass through the analyzer 6. All the other reflected waves are blocked by the analyzer 6. The reflected waves 8 pass through the Faraday rotator 4 in the opposite direction. At the output, the reflected waves 8 then have a polarization P3 at 90° to the direction P1 of the polarizer 1.

The reflected waves 8 are therefore stopped by the polarizer 1 and do not affect the source 3.

The invention concerns a method of depositing a ferromagnetic thin film 16 directly onto the surface of a waveguide 9. In accordance with the invention, the crystalline orientation of the ferromagnetic film 16 is restricted to a predetermined orientation by pulverizing nuclei that do not have said predetermined orientation.

The method deposits a ferromagnetic material onto the exterior surface of the waveguide using a vapor phase physical deposition method.

Said exterior surface is simultaneously irradiated with an ion beam at an angle of incidence which favors a predetermined crystalline direction and the energy of the ion beam is adjusted so that the nuclei that form with a crystalline texture different from the predetermined crystalline texture are pulverized by the ion beam.

In one embodiment of the method, before depositing the ferromagnetic material, a submicron layer 15 of a material favorable to the adhesion of the ferromagnetic film 16 is deposited.

This submicron adhesion layer 15 can advantageously have a composition gradient starting from a material that is optimal for the adhesion of the waveguide to a composition similar to that of the ferromagnetic film 16.

The invention also consists of a Faraday rotation magneto-optic isolator 20 in which the magnetic film 16 has been deposited by the method described hereinabove.

In one non-limiting embodiment, the magneto-optic isolator 20 can comprise a waveguide 9 comprising:

a substrate 10, for example of gadolinium galtium garnet ("GGG");

a buffer layer 11, for example of RE-IG;

an intermediate layer 12, for example of (BiGa) YIG;

an active layer 13 with a waveguide 17, for example of (Bi-Ga) YIG;

an insulative cover layer 14, for example of $SiO_2$ or $Si_3N_4$ (integral part of the guide);

a submicron attachment layer 15 having a composition gradient;

a magnetic layer 16, for example based on SmCo.

Of course, the invention is not limited to the embodiment or application described and shown, but is susceptible to many variants evident to the skilled person without departing from the scope of the invention. In particular, the YIG core waveguide can have various shapes without departing from the scope of the invention. Likewise, the material of the magnetic film can be changed without departing from the scope of the invention.

There is claimed:

1. A pulverization method for controlling crystalline direction during deposition of a ferromagnetic thin film onto a waveguide surface, comprising steps of:

(A) pre-selecting a desired crystalline orientation for a thin film to be deposited on the waveguide surface;

(B) while depositing the ferromagnetic thin film onto the waveguide surface, also simultaneously (1) irradiating an ion beam at the waveguide surface, said ion beam having a channelling angle of incidence favoring the preselected crystalline orientation, and (2) adjusting energy of the ion beam to pulverize nuclei having other than the pre-selected desired crystalline orientation.

2. A method as claimed in claim 1 wherein the step (B) of deposition of the ferromagnetic material is by vapor phase physical deposition.

3. A method as claimed in claim 2 further comprising, before the depositing step (B), depositing onto the waveguide a submicron layer of a material favorable to adhesion of the to-be deposited ferromagnetic film.

4. The method claimed in claim 3 wherein said submicron adhesion layer has a composition gradient in the range of a material that is optimal for adhesion to said waveguide to a composition close to that of said ferromagnetic film.

5. The method of claim 1, comprising directly depositing the thin film onto the surface of the waveguide.

6. The method of claim 1, wherein the waveguide comprises (Bi-Ga) yttrium-iron-garnet.

7. The method of claim 2, wherein the energy of the ion beam is adjusted from a few tens of eV to a few hundred eV.

* * * * *